(12) United States Patent
Efstathopoulos

(10) Patent No.: US 8,898,120 B1
(45) Date of Patent: Nov. 25, 2014

(54) SYSTEMS AND METHODS FOR DISTRIBUTED DATA DEDUPLICATION

(75) Inventor: Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 460 days.

(21) Appl. No.: 13/269,620

(22) Filed: Oct. 9, 2011

(51) Int. Cl.
*G06F 17/00* (2006.01)
*G06F 17/30* (2006.01)

(52) U.S. Cl.
CPC ...... *G06F 17/3007* (2013.01); *G06F 17/30097* (2013.01)
USPC ............................ 707/692; 707/698; 713/175

(58) Field of Classification Search
CPC .................... G06F 17/30563; G06F 17/30592; G06F 17/30595; G06F 11/1469; G06F 11/1471; G06F 17/30598; G06F 17/30997
See application file for complete search history.

(56) References Cited

U.S. PATENT DOCUMENTS

| | | | |
|---|---|---|---|
| 7,567,188 B1 | 7/2009 | Anglin et al. | |
| 2007/0103984 A1* | 5/2007 | Kavuri et al. | 365/185.17 |
| 2008/0205774 A1* | 8/2008 | Brinker et al. | 382/225 |
| 2009/0067746 A1* | 3/2009 | Monga | 382/276 |
| 2010/0228798 A1* | 9/2010 | Kodama et al. | 707/822 |
| 2010/0281051 A1* | 11/2010 | Sheffi et al. | 707/770 |
| 2011/0099351 A1* | 4/2011 | Condict | 711/216 |

OTHER PUBLICATIONS

Fanglu Guo; Systems and Methods for Performing Lookups on Distributed Deduplicated Data Systems; U.S. Appl. No. 13/233,900, filed Sep. 15, 2011.
Cezary Dubnicki, et al.; HYDRAstor: a Scalable Secondary Storage; 7th USENIX Conference on File and Storage Technologies; USENIX Association, Feb. 24, 2009.
Deepavali Bhagwat, et al.; Extreme Binning: Scalable, Parallel Deduplication for Chunk-based File Backup; HP Laboratories; IEEE Mascots; Sep. 21, 2009.
Petros Efstathopoulos; File Routing Middleware for Cloud Deduplication; Symantec Research Labs; Symantec Corporation; Culver City, US, 2012.
Wei Dong, et al; Tradeoffs in Scalable Data Routing for Deduplication Clusters; EMC, 2011.

* cited by examiner

*Primary Examiner* — Angelica Ruiz
(74) *Attorney, Agent, or Firm* — ALG Intellectual Property, LLC

(57) ABSTRACT

A computer-implemented method for distributed data deduplication may include (1) identifying a deduplicated data system, the deduplicated data system include a plurality of nodes, wherein each node within the plurality of nodes is configured to deduplicate data stored on the node, (2) identifying a data object to store within the deduplicated data system, (3) generating a similarity hash of the data object, the similarity hash representing a probabilistic dimension-reduction of the data object, (4) selecting, based at least in part on the similarity hash, a target node from the plurality nodes on which to store the data object, and then (5) routing the data object for storage on the target node based on the selection of the target node. Various other methods, systems, and computer-readable media are also disclosed.

20 Claims, 6 Drawing Sheets

SYSTEMS AND METHODS FOR DISTRIBUTED DATA DEDUPLICATION

BACKGROUND

Deduplicated data systems are often able to reduce the amount of space required to store files by recognizing redundant data patterns. For example, a deduplicated data system may reduce the amount of space required to store similar files by dividing the files into data segments and storing only unique data segments. In this example, each deduplicated file may simply consist of a list of data segments that make up the file.

With the advent of cloud storage, some deduplicated data systems may need to scale to store very large collections of data and/or to serve many clients. Accordingly, deduplicated data may be stored across many nodes. Unfortunately, even traditional multi-node deduplication techniques may scale poorly with enormous collections of data and/or large numbers of nodes. For example, traditional multi-node deduplication techniques may maintain a globally accessible index to detect duplicate data segments and keep a consistent view of all references to data segments across all nodes. Accordingly, as data collections increase in size and nodes increase in number, cross-node communications may consume network, memory, and/or storage resources at a disproportionate rate. As such, the instant disclosure identifies and addresses a need for additional and improved systems and methods for distributed data deduplication.

SUMMARY

As will be described in greater detail below, the instant disclosure generally relates to systems and methods for distributed data deduplication by deduplicating data that is stored on a plurality of nodes locally on each node and routing data objects (e.g., files) submitted for storage to nodes that are likely to efficiently deduplicate the data objects based on similarity hashes of the data objects. In one example, a computer-implemented method for distributed data deduplication may include (1) identifying a deduplicated data system, the deduplicated data system include a plurality of nodes, wherein each node within the plurality of nodes is configured to deduplicate data stored on the node, (2) identifying a data object to store within the deduplicated data system, (3) generating a similarity hash of the data object, the similarity hash representing a probabilistic dimension-reduction of the data object, (4) selecting, based at least in part on the similarity hash, a target node from the plurality nodes on which to store the data object, and then (5) routing the data object for storage on the target node based on the selection of the target node.

In some examples, selecting the target node may include additional factors. For example, selecting the target node may be further based on an aggregation of similarity hashes of data objects stored on the target node. Additionally or alternatively, selecting the target node may be further based on a file type of the data object. In a further example, selecting the target node may be further based on a frequency with which a client that accesses the deduplicated data system accesses the target node. In one embodiment, selecting the target node may be further based on a storage load on the target node falling below a determined threshold. In some examples, generating the similarity hash may include using an algorithm that maps data objects onto a hash space. The hash space may be partitioned among the plurality of nodes. In these examples, selecting the target node may include determining that the similarity hash falls within a partition of the hash space corresponding to the target node. In some examples, the computer-implemented method may also include determining, based on at least one characteristic of the data object, to generate at least one additional similarity hash of the data object. In these examples, selecting the target node may be further based on the additional similarity hash. The characteristic may include the size of the data object. Additionally or alternatively, the characteristic may include the file type of the data object. In some examples, the computer-implemented method may also include determining, based on at least one characteristic of the data object, that block-level deduplication is more efficient for the data object that file-level deduplication. In these examples, selecting the target node may be further based on a determination that the target node uses block-level deduplication.

In one embodiment, a system for implementing the above-described method may include (1) an identification module programmed to (i) identify a deduplicated data system, the deduplicated data system comprising a plurality of nodes, wherein each node within the plurality of nodes is configured to deduplicate data stored on the node, and (ii) identify a data object to store within the deduplicated data system, (2) a hashing module programmed to generate a similarity hash of the data object, the similarity hash representing a probabilistic dimension-reduction of the data object, (3) a selection module programmed to select, based at least in part on the similarity hash, a target node from the plurality nodes on which to store the data object, and (4) a routing module programmed to route the data object for storage on the target node based on the selection of the target node. The system may also include at least one processor configured to execute the identification module, the hashing module, the selection module, and the routing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a deduplicated data system, the deduplicated data system include a plurality of nodes, wherein each node within the plurality of nodes is configured to deduplicate data stored on the node, (2) identify a data object to store within the deduplicated data system, (3) generate a similarity hash of the data object, the similarity hash representing a probabilistic dimension-reduction of the data object, (4) select, based at least in part on the similarity hash, a target node from the plurality nodes on which to store the data object, and then (5) route the data object for storage on the target node based on the selection of the target node.

As will be explained in greater detail below, by deduplicating data that is stored on a plurality of nodes locally on each node and routing data objects (e.g., files) submitted for storage to nodes that are likely to efficiently deduplicate the data objects based on similarity hashes of the data objects, the systems and methods described herein may achieve a substantial rate of deduplication while potentially improving the scalability of a deduplicated data system. Additionally, in some examples, by performing deduplication locally on each node, these systems and methods may increase the flexibility of node configuration (e.g., by facilitating heterogeneous nodes and/or heterogeneous deduplication systems on the nodes). Furthermore, in some examples, these systems and methods may determine whether a data object is better suited for file-level or block-level deduplication and route the data object accordingly, thereby potentially improving deduplication performance.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
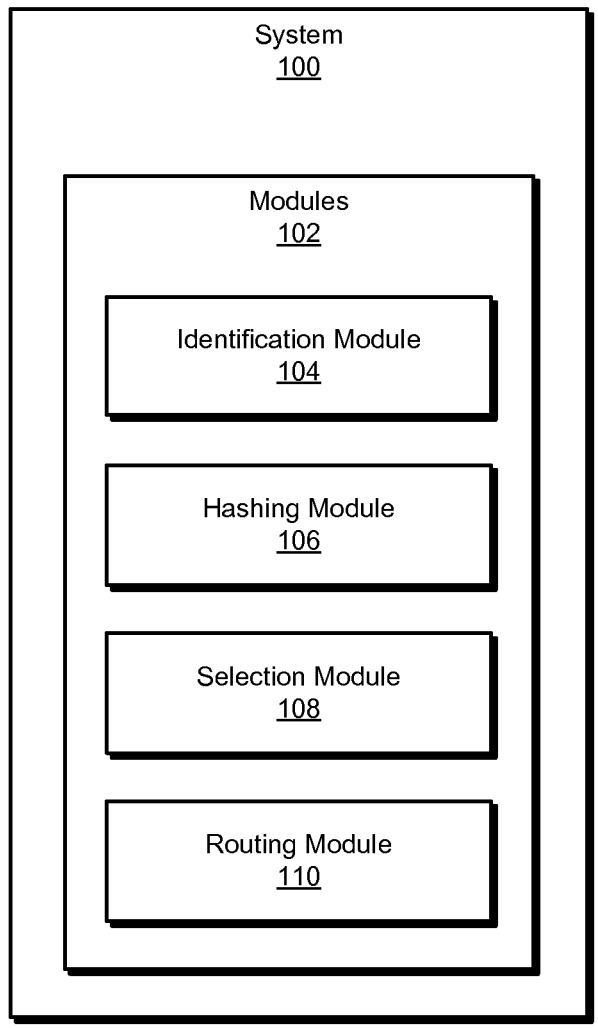
FIG. 1 is a block diagram of an exemplary system for distributed data deduplication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
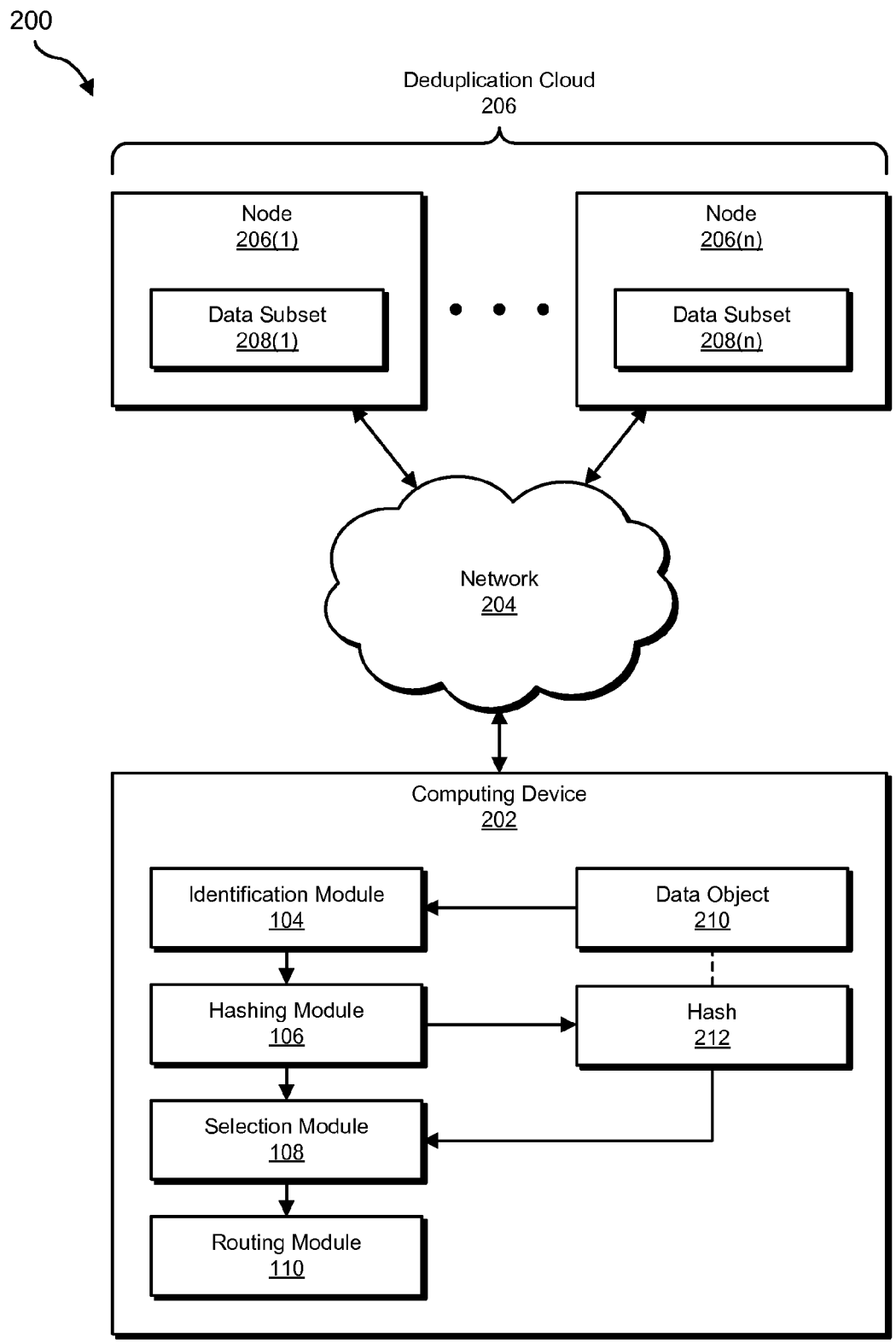
FIG. 2 is a block diagram of an exemplary system for distributed data deduplication.
Figure 3:
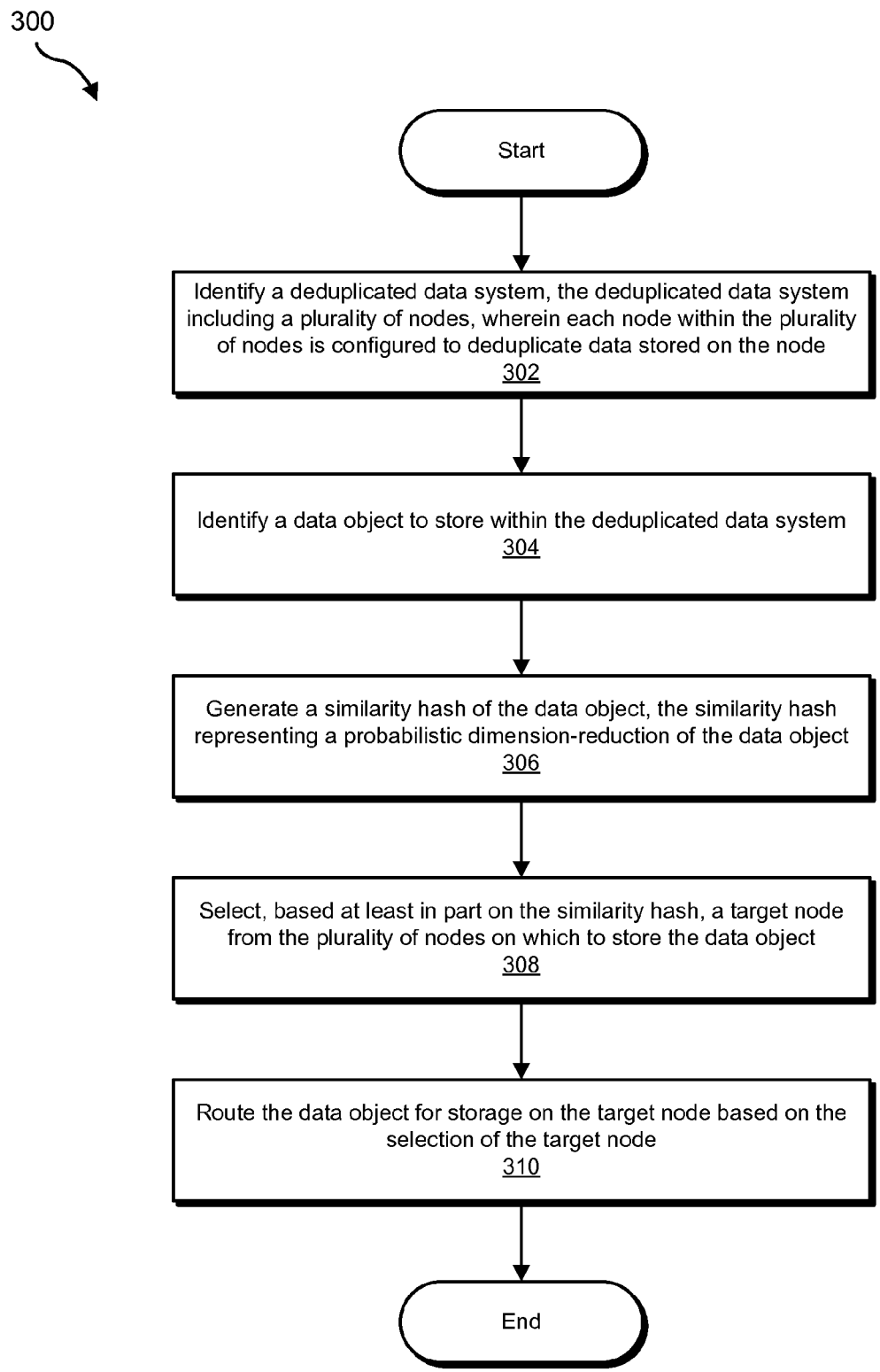
FIG. 3 is a flow diagram of an exemplary method for distributed data deduplication.
Figure 4:
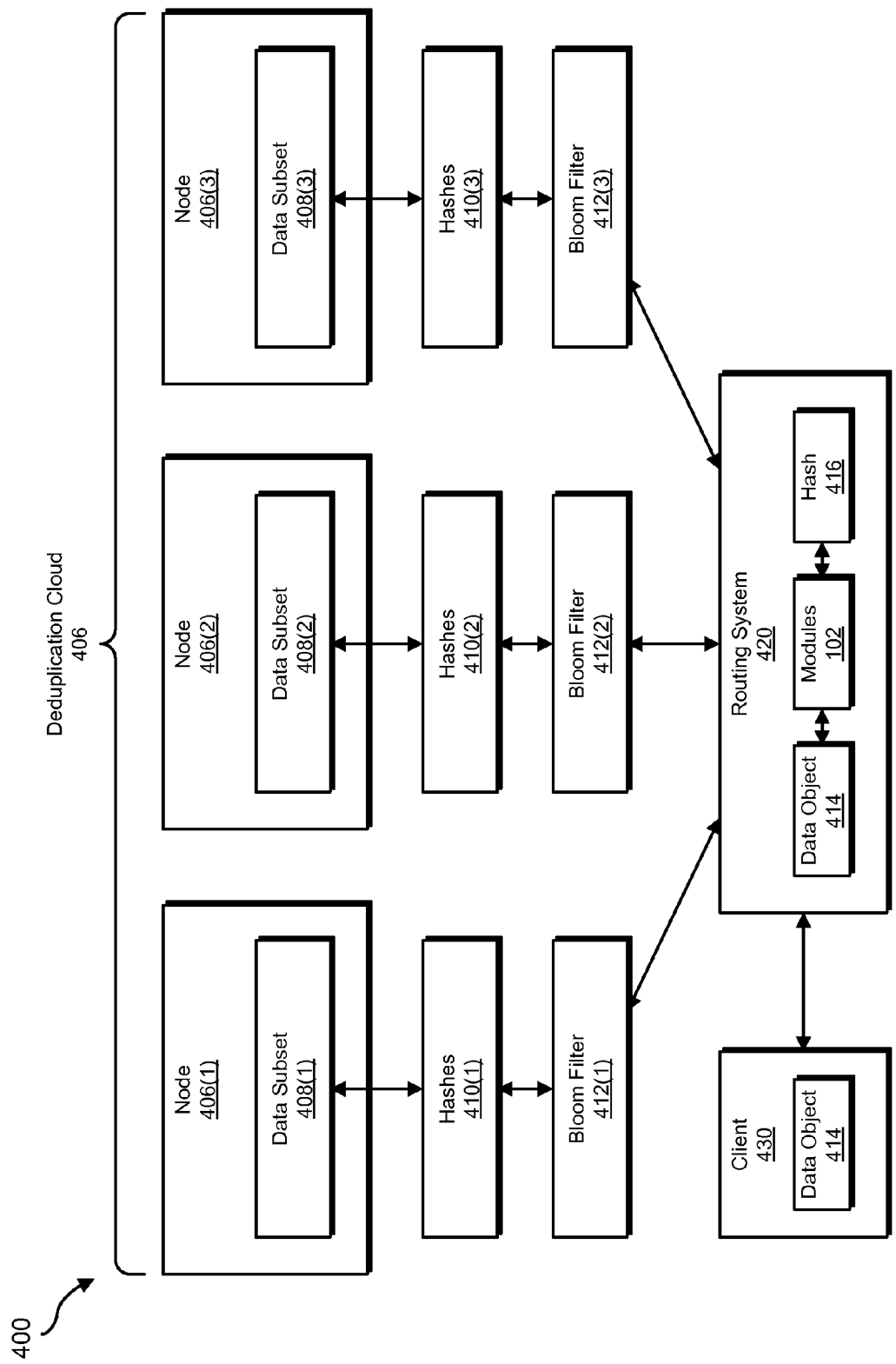
FIG. 4 is a block diagram of an exemplary system for distributed data deduplication.

The following will provide, with reference to FIGS. 1, 2, and 4, detailed descriptions of exemplary systems for distributed data deduplication. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for distributed data deduplication. As illustrated in this figure, exemplary system 100 may include one or more modules 102 for performing one or more tasks. For example, and as will be explained in greater detail below, exemplary system 100 may include an identification module 104 programmed to (1) identify a deduplicated data system, the deduplicated data system comprising a plurality of nodes, wherein each node within the plurality of nodes is configured to deduplicate data stored on the node, and (2) identify a data object to store within the deduplicated data system. Exemplary system 100 may also include a hashing module 106 programmed to generate a similarity hash of the data object, the similarity hash representing a probabilistic dimension-reduction of the data object.

In addition, and as will be described in greater detail below, exemplary system 100 may include a selection module 108 programmed to select, based at least in part on the similarity hash, a target node from the plurality nodes on which to store the data object. Exemplary system 100 may also include a routing module 110 programmed to route the data object for storage on the target node based on the selection of the target node. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or nodes 206(1)-(n)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a deduplication cloud 206 via a network 204.

In one embodiment, one or more of modules 102 from FIG. 1 may, when executed by at least one processor of computing device 202, facilitate computing device 202 in distributed data deduplication. For example, and as will be described in greater detail below, one or more of modules 102 may cause computing device 202 to (1) identify a deduplicated data system (e.g., deduplication cloud 206), the deduplicated data system include a plurality of nodes (e.g., nodes 206(1)-(n)), wherein each node within the plurality of nodes is configured to deduplicate data stored on the node (e.g., data subsets 208(1)-(n)), (2) identify a data object (e.g., a data object 210) to store within the deduplicated data system, (3) generate a similarity hash of the data object (e.g., a hash 212), the similarity hash representing a probabilistic dimension-reduction of the data object, (4) select, based at least in part on the similarity hash, a target node from the plurality nodes (e.g., node 206(1)) on which to store the data object, and then (5) route the data object for storage on the target node based on the selection of the target node (e.g., route data object 210 for storage on node 206(1)).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Nodes 206(1)-(n) generally represent any type or form of computing devices that are capable of deduplicating data and/or storing deduplicated data. Examples of nodes 206(1)-(n) include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and deduplication cloud 206.

FIG. 3 is a flow diagram of an exemplary computer-implemented method 300 for distributed data deduplication. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a deduplicated data system, the deduplicated data system including a plurality of nodes, wherein each node within the plurality of nodes is configured to deduplicate data stored on the node. For example, at step 302 identification module 104 may, as part of computing device 202 in FIG. 2, identify deduplication cloud 206 including nodes 206(1)-(n) which are configured to deduplicate, respectively, data subsets 208(1)-(n).

As used herein, the phrase "deduplicated data" generally refers to data stored by storage systems that reduce redundant data by referencing a single instance of a data unit (e.g., a data segment, a file, etc.) multiple times rather than separately storing each instance of the data unit. As will be explained in greater detail below, in some examples, the deduplicated data system may not fully deduplicate stored data. For example, the systems and methods described herein may reduce ten instances of a unit of data to three stored instances instead of one stored instance.

In some examples, data within the deduplicated data system may originate from a plurality of clients. For example, as mentioned above, the deduplicated data system may include a plurality of nodes. The plurality of nodes may operate as a part of a cloud storage service configured to store data owned by different entities and submitted by corresponding client systems. In these examples, the cloud storage service may deduplicate data across clients.

As used herein, the term "node" may include any networked device capable of executing one or more of the modules described herein and/or storing deduplicated data. In some examples, the term "node" may refer to a group of computing devices configured to operate as a unit within a wider context of other nodes. For example, the plurality of nodes may include a "super node" which, in turn, includes multiple nodes. Such a "super node" may allow for increased configuration flexibility (e.g., by joining a multi-node deduplication system with the larger deduplicated data system) and/or improved privacy and/or security by not requiring a view of each node within the super node for the super node to join the plurality of nodes. In some examples, each node within the plurality of nodes may operate as a separate and/or independent deduplication system. For example, each node may store a subset of files within the deduplicated data system and locally deduplicate its own subset of files (e.g., such that data is deduplicated within nodes but not across nodes). In these examples, the plurality of nodes may include a heterogeneous group of deduplication systems. For example, one node may include a full deduplication system (e.g., a deduplication appliance) such as SYMANTEC PUREDISK, while another node may include a deduplicating file system. By performing deduplication at the node level and routing files for deduplication to nodes, the systems and methods described herein may enable a node-agnostic multi-node deduplication system (e.g., each node may use any deduplication system without any particular requirements). In some examples, one or more nodes may lack deduplication awareness.

FIG. 4 illustrates an exemplary system 400 for distributed data deduplication. As shown in FIG. 4, exemplary system 400 may include a deduplication cloud 406 in communication with a client 430 via a routing system 420. For example, client 430 may store data on deduplication cloud 406 by submitting data objects to routing system 420, which in turn may determine to which of nodes 406(1), 406(2), and 406(3) to route each data object. Using FIG. 4 as an example, at step 302 identification module 104 may, as a part of modules 102 on routing system 420, identify deduplication cloud 406.

In some examples, routing system 420 may represent a separate computing device and/or appliance configured for routing data objects to nodes within the plurality of nodes. Additionally or alternatively, routing system 420 may represent one or more modules on a client system (such as client 430). In some examples, routing system 420 may operate as a part of a node within the plurality of nodes. For example, each node may include modules 102 and, accordingly, the capability to route data objects to other nodes within the plurality of nodes.

Returning to FIG. 3, at step 304 one or more of the systems described herein may identify a data object to store within the deduplicated data system. For example, at step 304 identification module 104 may, as part of computing device 202 in FIG. 2, identify data object 210 to store within deduplication cloud 206. Using FIG. 4 as an additional example, at step 304 identification module 104 may, as part of routing system 420, identify a data object 414 to store within deduplication cloud 406 (e.g., by receiving data object 414 from client 430).

As used herein, the phrase "data object" may refer any form or type of data entity and/or digital information. For example, the phrase "data object" may refer to a file. Additional examples of data objects include, without limitations, file segments, data volumes, and database entries.

Identification module 104 may identify the data object in any of a variety of contexts. For example, identification module 104 may operate as a part of a routing appliance for the plurality of nodes. In this example, identification module 104 may identify the data object by receiving the data object from a client that has submitted the data object for storage on the deduplicated data system. In another example, identification module 104 may operate as a part of a node within the plurality of nodes. In this example, identification module 104 may identify the data object by receiving the data object from a client that has submitted the data object to a node (e.g., a default node assigned to the client) for storage on the deduplicated data system. In an additional example, identification module 104 may operate as a part of a client that is attempting to store the data object on the deduplicated data system. In this example, identification module 104 may identify the data object by identifying an attempt to write the data object to a virtual data volume that represents cloud storage on the client.

Returning to FIG. 3, at step 306 one or more of the systems described herein may generate a similarity hash of the data object, the similarity hash representing a probabilistic dimension-reduction of the data object. For example, at step 306 hashing module 106 may, as part of computing device 202 in FIG. 2, generate hash 212 of data object 210. Using FIG. 4 as an additional example, at step 306 hashing module 106 may, as part of routing system 420, generate a hash 416 of data object 414.

As used herein, the phrase "similarity hash" may represent any hash, fingerprint, and/or signature of a data object that tends to match with a corresponding hash, fingerprint, and/or signature of a similar data object (e.g., where files with the same hashes will likely have a substantial proportion of data blocks in common). Accordingly, the similarity hash may represent a probabilistic dimension-reduction of the data object in that the similarity hash may correspond to one or more relevant features of the data object (e.g., features of the data object that indicate and/or correlate with the presence of certain data blocks). For example, the similarity hash may represent a locality-sensitive hash.

Hashing module 106 may generate the similarity hash in any suitable manner. In some examples, hashing module 106 may identify a representative sample of the data object. For example, hashing module 106 may ascertain a file type of the data object (e.g., using metadata associated with the data object, a file extension of the data object, contents of the data object, the size of the data object, etc.). Hashing module 106 may also sample a portion of the data object based on a pre-defined property of the data object. For example, hashing module 106 may locate the first point in the data object that satisfies the pre-defined property, and then sample a given length of the data object after that point. As an illustration, hashing module 106 may locate the first point in the data object where the value of a rolling checksum over the data object ends in "0x00" and sample the subsequent 64 bytes. Hashing module 106 may then use the sample in conjunction with the file type to generate the similarity hash. In some examples, as will be described in greater detail below, hashing module 106 may generate the similarity hash using an algorithm that maps data objects onto a hash space that may be partitioned among the plurality of nodes.

In some examples, hashing module 106 may generate the similarity hash based on the size of the data object and/or the type of the data object. For example, if the data object is smaller than a predetermined size (e.g., 8 megabytes) and the data object is of a file type that is generally is changed incrementally (e.g., spreadsheets, word-processing documents, etc.), then hashing module 106 may generate the similarity hash based on the sampling method described above. Additionally, if the data object is smaller than the predetermined size and not of a file type that is generally changed incrementally, hashing module 106 may generate the similarity hash by generating a hash of the entire data object. In some examples, if the size of the data object is above the predetermined size, hashing module 106 may determine whether the file type of the data object indicates a need for one or multiple similarity hashes to represent the data object. In these examples, hashing module 106 may generate additional similarity hashes for files such as virtual machine disk files, disk images, and/or library files.

Returning to FIG. 3, at step 308 one or more of the systems described herein may select, based at least in part on the similarity hash, a target node from the plurality of nodes on which to store the data object. For example, at step 308 selection module 108 may, as part of computing device 202 in FIG. 2, select node 206(1) for storing data object 210 based at least in part on hash 212. Using FIG. 4 as an additional example, at step 308 selection module 108 may, as part of routing system 420, select node 406(2) to store data object 414 based at least in part on hash 416.

Selection module 108 may use any of a number of additional criteria for selecting the target node on which to store the data object. In some examples, selection module 108 may select the target node further based on an aggregation of similarity hashes of data objects stored on the target node. For example, one or more of the systems described herein may aggregate the similarity hashes of data objects stored on each node in order to compare the similarity hash of the data object with the aggregation of the similarity hashes on each node to determine which nodes likely have stored instances of a substantial proportion of the data blocks within the data object. In some examples, selection module 108 may compare the similarity hash to all of the aggregations. Alternatively, selection module 108 may compare the similarity hash to a sample and/or subset of the aggregations. In some examples, selection module 108 may compare the similarity hash to aggregations until a matching threshold is met. For example, selection module 108 may use a stopping rule to determine when the cost of analyzing the aggregations of the respective nodes is likely to exceed the marginal expected value of finding a node that better matches the similarity hash.

In some examples, the aggregation of similarity hashes of data objects for each node may be generated and/or stored on that node. Additionally or alternatively, the aggregation of similarity hashes of data objects for each node may be generated and/or stored on a system that encapsulates the node and/or separates the node from a routing system. In some examples, the routing system may include the aggregation of similarity hashes of data objects for each node. In one example, the aggregation of similarity hashes of data objects for each node may include a bloom filter. For example, each node may include a bloom filter populated with the similarity hashes of all data objects stored on the node. Selection module 108 may test the similarity hash of the data object against the bloom filter of each node (or a subset of nodes) to determine if the similarity hash is already likely represented in the bloom filter—and, accordingly, if the node likely stores instances of data blocks included in the data object. Selection module 108 may then select the target node based at least in part on a determination that the similarity hash passed the bloom filter. As will be described in greater detail below, in some examples the systems described herein may generate multiple similarity hashes of the data object (e.g., based on multiple samples from the data object). In these examples, selection module 108 may test all of the similarity hashes of the data object on the bloom filters and select the target node based in part on the bloom filter of the target node passing more of the similarity hashes of the data objects than bloom filters of other nodes.

Using FIG. 4 as an example, nodes 406(1), 406(2), and 406(3) may store data subsets 408(1), 408(2), and 408(3), respectively. Bloom filters 412(1), 412(2), and 412(3) may be populated by hashes 410(1), 410(2), and 410(3) of data subsets 408(1), 408(2), and 408(3), respectively. Data subset 408(2) may include one or more files similar to data object 414, and, accordingly, hashes 410(2) may include hash 416. Accordingly, selection module 108 may, as a part of routing system 420, test hash 416 against bloom filters 412(1), 412(2), and 412(3), and determine that hash 416 passes bloom filter 412(2). Selection module 108 may therefore select node 406(2) for storing data object 414.

As mentioned above, in some examples selection module 108 may only test a subset of nodes in order to select the target node. In these examples, selection module 108 may select the subset of nodes in any of a variety of ways. For example, selection module 108 may select a random subset. Additionally or alternatively, selection module 108 may identify a history of nodes previously checked for a client submitting the data object and select the same subset.

As mentioned earlier, in some examples one or more of the systems described herein may generate the similarity hash using an algorithm that maps data objects onto a hash space, and that hash space may be partitioned among the plurality of nodes. For example, selection module 108 may maintain a table assigning partitions of the hash spaces to the various nodes in the plurality of nodes. In these examples, selection module 108 may select the target node by determining that the similarity hash falls within a partition of the hash space corresponding to the target node. Generally, selection module 108 may use any consistent hashing scheme for assigning the hash space to the nodes. For example, selection module 108 may use a distributed hash table to partition the hash space. Additionally or alternatively, selection module 108 may use a consistent hashing algorithm such as cuckoo hashing. For example, selection module 108 may treat a list of the plurality of nodes as a hash table and a highly-loaded node as a hashing collision.

In some examples, one or more of the systems described herein may determine, based on at least one characteristic of the data object, to generate at least one additional similarity hash of the data object. As mentioned earlier, in some examples, one or more of the systems described herein may generate additional similarity hashes for the data object if the size of the data object is above a predetermined size and the file type of the data object indicates a need for one or multiple similarity hashes to represent the data object (e.g., virtual machine disk files, disk images, library files, etc.). In these examples, selection module 108 may select the target node based in part on the additional similarity hash or hashes. For example, as mentioned earlier, selection module 108 may select the target node based in part on the number of similarity hashes of the data object passing the bloom filter of the target node.

In some examples, selection module 108 may select the target node further based on a file type of the data object. For example, selection module 108 may receive the file type of the data object along with the similarity hash of the data object. Selection module 108 may then select the target node based on the number of similarly-typed files stored on the target node. Additionally or alternatively, one or more of the systems described herein may have used the file type of the data object to generate the similarity hash of the data object. Accordingly, selection module 108 may select the target node based in part on the file type of the data object simply by using the similarity hash in selecting the target node.

Selection module 108 also may select the target node based in part on a storage load on the target node falling below a predetermined threshold. As used herein, the phrase "storage load" may refer to any metric for resource consumption of a computing system. For example, the phrase "storage load" may refer to how much data is stored on the node, how much data is retrieved from the node, an average and/or expected processing load on the node, an average and/or expected I/O load on the node, or any combination thereof.

In some examples, selection module 108 may select the target node based in part on a frequency with which a client that accesses the deduplicated data system accesses the target node. For example, selection module 108 may determine that a client that submitted the data object for storage in the deduplicated data system frequently accesses data from the target node. Accordingly, selection module 108 may select the target node for storing the data object.

Selection module 108 may also select the target node based in part on the type of deduplication used by the node. For example, selection module 108 may determine, based on at least one characteristic of the data object, that block-level deduplication is more efficient for the data object than file-level deduplication. Selection module 108 may then select the target node based on a determination that the target node uses block-level deduplication. For example, selection module 108 may select block-level deduplication nodes for data objects such as word processing documents, spreadsheets, and/or virtual machine disk files, for which many slightly altered versions may exist.

Returning to FIG. 3, at step 310 one or more of the systems described herein may route the data object for storage on the target node based on the selection of the target node. For example, at step 310 routing module 110 may, as part of computing device 202 in FIG. 2, route data object 210 for storage on node 206(1). Using FIG. 4 as an additional example, at step 310 routing module 110 may, as part of routing system 420, route data object 210 for storage on node 406(2).

Routing module 110 may route the data object to the target node in any suitable manner. For example, routing module 110 may transmit the data object to the target node. Additionally or alternatively, routing module 110 may transmit a fingerprint of the data object (in the case that the target node uses file-level deduplication) or fingerprints of data blocks of the data object (in the case that the target node uses block-level deduplication) and then transmit any data not identified by the target node as already stored on the target node. After step 310, method 300 may terminate.

As explained above, by deduplicating data that is stored on a plurality of nodes locally on each node and routing data objects (e.g., files) submitted for storage to nodes that are likely to efficiently deduplicate the data objects based on similarity hashes of the data objects, the systems and methods described herein may achieve a substantial rate of deduplication while potentially improving the scalability of a deduplicated data system. Additionally, in some examples, by performing deduplication locally on each node, these systems and methods may increase the flexibility of node configuration (e.g., by facilitating heterogeneous nodes and/or heterogeneous deduplication systems on the nodes). Furthermore, in some examples, these systems and methods may determine whether a data object is better suited for file-level or block-level deduplication and route the data object accordingly, thereby potentially improving deduplication performance. In some examples, these systems and methods may also improve multi-node deduplication reliability by containing each deduplicated file to a single node (e.g., rather than deduplicating blocks of a file across many nodes), thereby potentially reducing the number of failure points for each file to a single failure point.

Figure 5:
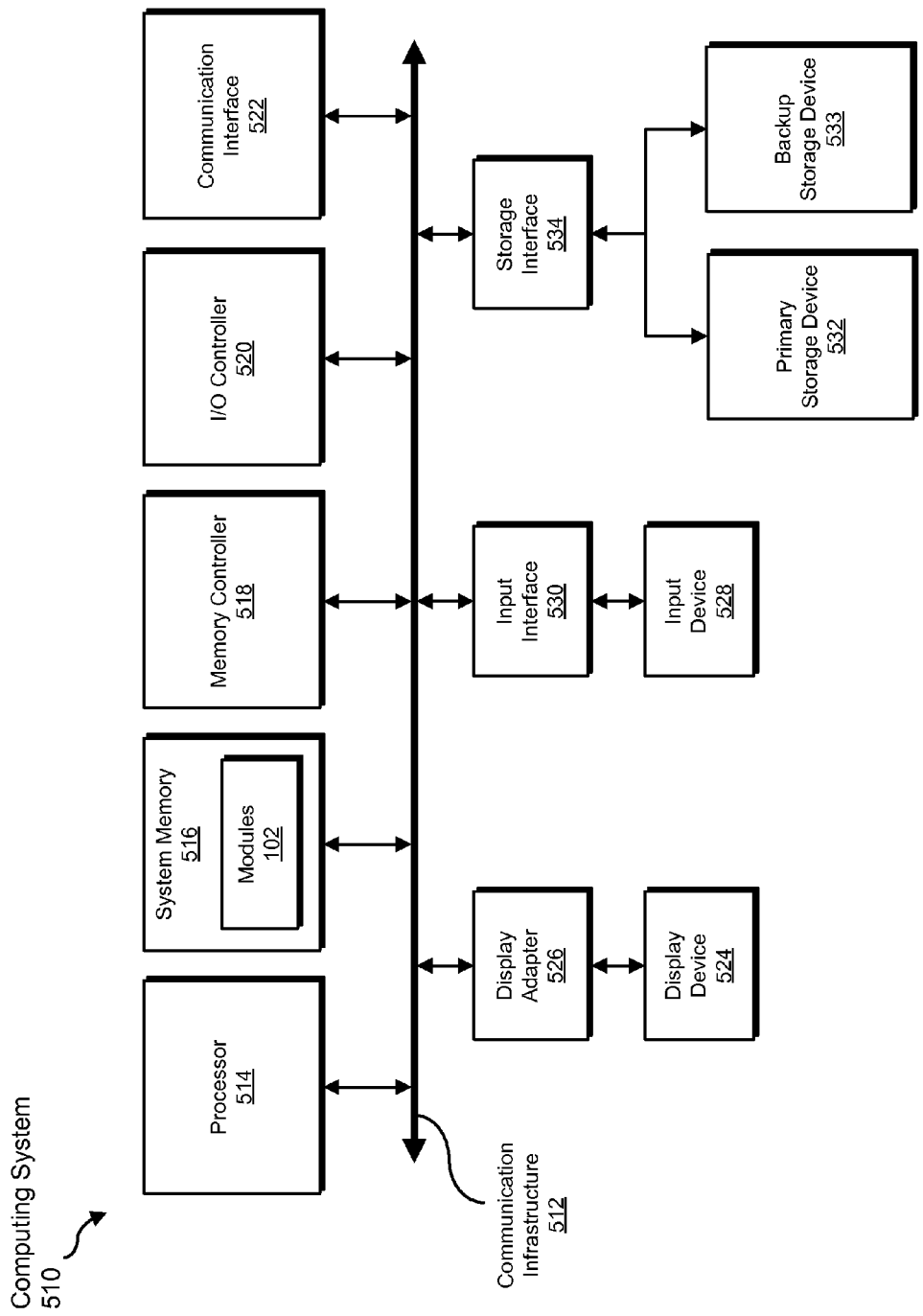
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, generating, selecting, determining, and/or routing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
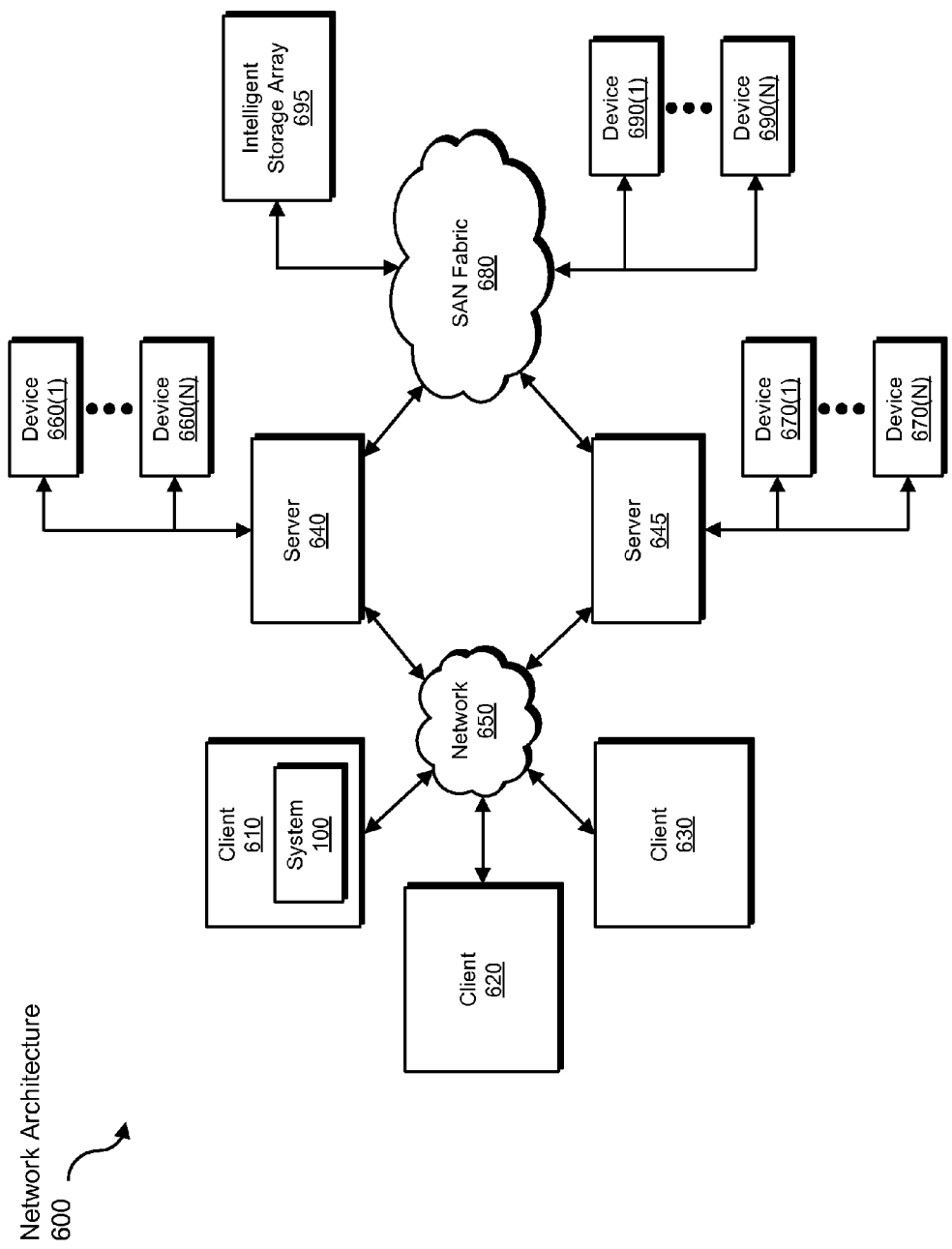
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, generating, selecting, determining, and/or routing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for distributed data deduplication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. In some examples, a cloud-computing environment may include thousands of nodes. For example, the plurality of nodes within the deduplicated data system may include thousands of nodes.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for efficiently routing data objects in multi-node deduplication systems. In another example, one or more of the modules recited herein may transform a plurality of computing systems into a scalable system for efficiently deduplicating data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for distributed data deduplication, at least a portion of the method being performed by a computing device comprising at least one processor, the method comprising:
   identifying a deduplicated data system, the deduplicated data system comprising a plurality of nodes, wherein each node within the plurality of nodes is configured to deduplicate data stored on the node;
   identifying a data object to store within the deduplicated data system;
   generating a similarity hash of the data object, the similarity hash representing a probabilistic dimension-reduction of the data object;
   determining, based on at least one characteristic of the data object, that block-level deduplication is more efficient for the data object that file-level deduplication;
   selecting a target node from the plurality of nodes that uses block-level deduplication instead of a candidate node that uses file-level deduplication based at least in part on the similarity hash and at least in part on a determination that the target node uses block-level deduplication instead of file-level deduplication;
   routing the data object for storage on the target node based on the selection of the target node.

2. The computer-implemented method of claim 1, wherein selecting the target node from the plurality of nodes is further based on an aggregation of similarity hashes of data objects stored on the target node.

3. The computer-implemented method of claim 1, wherein:
   generating the similarity hash comprises generating the similarity hash using an algorithm that maps data objects onto a hash space;
   the hash space is partitioned among the plurality of nodes;
   selecting the target node from the plurality of nodes comprises determining that the similarity hash falls within a partition of the hash space corresponding to the target node.

4. The computer-implemented method of claim 1, further comprising determining, based on at least one attribute of the data object, to generate at least one additional similarity hash of the data object;
   wherein selecting the target node is further based on the additional similarity hash.

5. The computer-implemented method of claim 4, wherein the attribute of the data object comprises the size of the data object.

6. The computer-implemented method of claim 4, wherein the attribute of the data object comprises a file type of the data object.

7. The computer-implemented method of claim 1, wherein selecting the target node is further based on a file type of the data object.

8. The computer-implemented method of claim 1, wherein selecting the target node is further based on a storage load on the target node falling below a determined threshold.

9. The computer-implemented method of claim 1, wherein selecting the target node is further based on a frequency with which a client that accesses the deduplicated data system accesses the target node.

10. A system for distributed data deduplication, the system comprising:
    an identification module programmed to:
    identify a deduplicated data system, the deduplicated data system comprising a plurality of nodes, wherein each node within the plurality of nodes is configured to deduplicate data stored on the node;
    identify a data object to store within the deduplicated data system;
    a hashing module programmed to generate a similarity hash of the data object, the similarity hash representing a probabilistic dimension-reduction of the data object;
    a selection module programmed to:
    determine, based on at least one characteristic of the data object, that block-level deduplication is more efficient for the data object that file-level deduplication;
    select a target node from the plurality of nodes that uses block-level deduplication instead of a candidate node that uses file-level deduplication based at least in part on the similarity hash and at least in part on a determination that the target node uses block-level deduplication instead of file-level deduplication;

a routing module programmed to route the data object for storage on the target node based on the selection of the target node;

at least one processor configured to execute the identification module, the hashing module, the selection module, and the routing module.

11. The system of claim 10, wherein the selection module is programmed to select the target node from the plurality of nodes further based on an aggregation of similarity hashes of data objects stored on the target node.

12. The system of claim 10, wherein:

the hashing module is programmed to generate the similarity hash by using an algorithm that maps data objects onto a hash space;

the hash space is partitioned among the plurality of nodes;

the selection module is programmed to select the target node from the plurality of nodes by determining that the similarity hash falls within a partition of the hash space corresponding to the target node.

13. The system of claim 10, wherein:

the hashing module is further programmed to determine, based on at least one attribute of the data object, to generate at least one additional similarity hash of the data object;

the selection module is programmed to select the target node further based on the additional similarity hash.

14. The system of claim 13, wherein the attribute of the data object comprises the size of the data object.

15. The system of claim 13, wherein the attribute of the data object comprises a file type of the data object.

16. The system of claim 10, wherein the selection module is programmed to select the target node further based on a file type of the data object.

17. The system of claim 10, wherein the selection module is programmed to select the target node further based on a storage load on the target node falling below a determined threshold.

18. The system of claim 10, wherein the selection module is programmed to select the target node further based on a frequency with which a client that accesses the deduplicated data system accesses the target node.

19. A non-transitory computer-readable-storage medium comprising one or more computer-executable instructions that are executed by at least one processor of a computing device and cause the computing device to:

identify a deduplicated data system, the deduplicated data system comprising a plurality of nodes, wherein each node within the plurality of nodes is configured to deduplicate data stored on the node;

identify a data object to store within the deduplicated data system;

generate a similarity hash of the data object, the similarity hash representing a probabilistic dimension-reduction of the data object;

determine, based on at least one characteristic of the data object, that block-level deduplication is more efficient for the data object that file-level deduplication;

select a target node from the plurality of nodes that uses block-level deduplication instead of a candidate node that uses file-level deduplication based at least in part on the similarity hash and at least in part on a determination that the target node uses block-level deduplication instead of file-level deduplication;

route the data object for storage on the target node based on the selection of the target node.

20. The computer-readable-storage medium of claim 19, wherein selecting the target node from the plurality of nodes is further based on an aggregation of similarity hashes of data objects stored on the target node.

* * * * *

UNITED STATES PATENT AND TRADEMARK OFFICE
CERTIFICATE OF CORRECTION

PATENT NO.        : 8,898,120 B1
APPLICATION NO.   : 13/269620
DATED             : November 25, 2014
INVENTOR(S)       : Petros Efstathopoulos It is certified that error appears in the above-identified patent and that said Letters Patent is hereby corrected as shown below:

In the Claims,

Claim 1, at column 16, lines 4-6, should read:

determining, based on at least one characteristic of the data object, that block-level deduplication is more efficient for the data object than file-level deduplication;

Claim 10, at column 16, lines 63-65, should read:

determine, based on at least one characteristic of the data object, that block-level deduplication is more efficient for the data object than file-level deduplication;

Claim 19, at column 18, lines 22-24, should read:

determine, based on at least one characteristic of the data object, that block-level deduplication is more efficient for the data object than file-level deduplication;

Signed and Sealed this
Twenty-sixth Day of May, 2015

Michelle K. Lee
*Director of the United States Patent and Trademark Office*